United States Patent [19]

Tabler et al.

[11] Patent Number: 4,574,962
[45] Date of Patent: Mar. 11, 1986

[54] STORAGE AND RETRIEVAL SYSTEM

[75] Inventors: Charles P. Tabler; Theodore R. Devins, both of Hamilton, Ohio

[73] Assignee: Buckhorn Material Handling Group, Inc., Cincinnati, Ohio

[21] Appl. No.: 488,590

[22] Filed: Apr. 25, 1983

[51] Int. Cl.[4] .............................................. A47F 5/02
[52] U.S. Cl. ..................................... 211/122; 312/268
[58] Field of Search ............... 198/793, 570; 414/285, 414/331, 787; 312/125, 135, 97.1, 268, 305; 211/1.5, 122

[56] References Cited

U.S. PATENT DOCUMENTS

| | | | |
|---|---|---|---|
| 1,276,007 | 8/1918 | Bausman | 198/793 |
| 1,763,073 | 6/1930 | Taylor | 198/570 |
| 1,864,822 | 6/1932 | Heuze | 198/793 X |
| 1,992,861 | 2/1935 | Demos | 198/793 X |
| 2,342,468 | 2/1944 | Hallwood | 198/793 |
| 2,866,537 | 12/1958 | Immesberger | 198/793 |
| 3,040,874 | 6/1962 | Lyman | 198/793 |
| 3,319,038 | 5/1967 | Meister et al. | 198/793 X |
| 3,384,097 | 5/1968 | Meeker et al. | 198/793 X |
| 3,465,867 | 9/1969 | Gartner et al. | 198/793 |
| 3,554,391 | 1/1971 | Goodell | 414/331 |
| 3,780,852 | 12/1973 | Weiss et al. | 198/793 X |
| 3,792,785 | 2/1974 | Weir | 414/281 X |
| 4,048,984 | 9/1977 | Eberhardt | 198/793 X |
| 4,379,602 | 4/1983 | Iemura et al. | 312/135 X |
| 4,389,157 | 6/1983 | Bernard, II et al. | 414/278 X |
| 4,399,908 | 8/1983 | Gunti | 198/860 X |
| 4,402,393 | 9/1983 | Kent | 198/793 X |

FOREIGN PATENT DOCUMENTS

| | | |
|---|---|---|
| 541157 | 9/1921 | France . |
| 655605 | 8/1963 | Italy .................................. 198/793 |
| 346480 | 6/1960 | Switzerland . |
| 2099775 | 12/1982 | United Kingdom . |
| 737317 | 6/1980 | U.S.S.R. . |

Primary Examiner—Robert J. Spar
Assistant Examiner—Stuart J. Millman
Attorney, Agent, or Firm—Beall Law Offices

[57] ABSTRACT

A storage and retrieval system has a plurality of conveyor sections mounted one above the other on a frame. Each conveyor section can move a tray with a box of articles thereon between a loading station and a picking station automatically according to a keyboard entry control. Each conveyor section has a plurality of the trays secured together by a driven chain in an endless loop, with the trays being supported on an endless array of horizontal undriven rollers.

46 Claims, 6 Drawing Figures

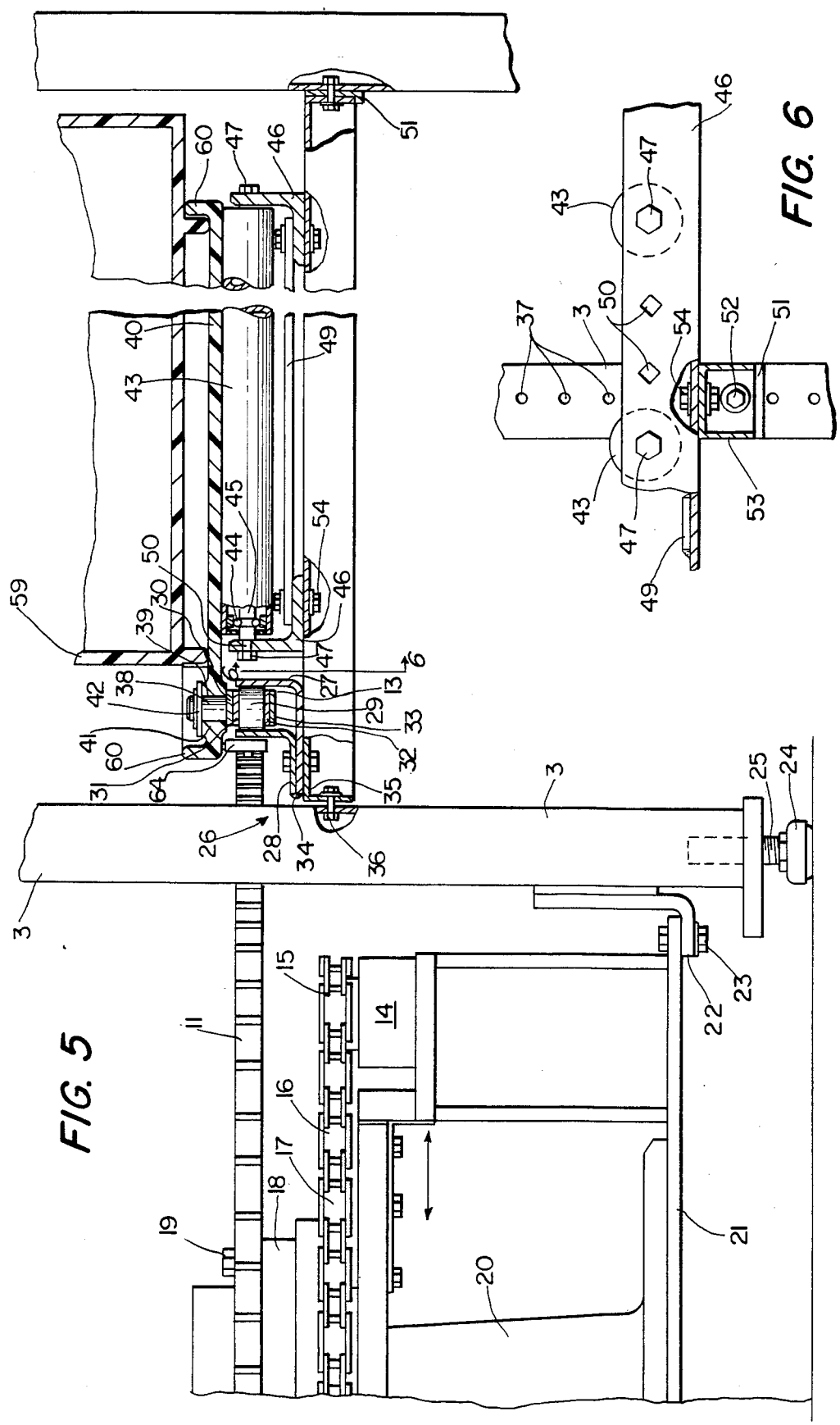

STORAGE AND RETRIEVAL SYSTEM

BACKGROUND OF THE INVENTION

The present invention relates to storage and retrieval systems wherein a plurality of different articles are separately stored on a conveyor and selectively brought to a loading station or a picking station.

A known storage and retrieval system employs a plurality of endless conveyor sections mounted one above the other on a frame, with each conveyor section including an endless chain having a plurality of trays drivingly connected to it and spaced along its outer periphery for supporting a corresponding plurality of open top containers that have therein the articles to be stored and retrieved. Each tray is provided with at least two inner wheels that ride on an inner wheel track, and at least two outer wheels that ride on a separate outer wheel track.

This known apparatus requires the accurate location of the wheel tracks. The chain is a special made chain with three different types of links.

SUMMARY OF THE INVENTION

It is an object of the present invention to provide a storage and retrieval system that will be less expensive to manufacture, less expensive to install, quicker to install, composed of more standardized parts capable of quickly and easily changing its load capacity, even on an existing set-up, and which will be simpler and less costly to maintain than the systems in the prior art.

These and other objects are accomplished by providing a standard chain interconnecting the trays and controlling the positioning, in a horizontal plane, of the trays by means of a chain guide. The chain is free to move vertically relative to the stationary chain guide, within limits, to accommodate manufacturing and assembly tolerances. The entire weight of the trays, and their contents (boxes and articles within the boxes), are supported on an endless array of undriven rollers mounted along the path to engage the bottom of the trays and rotate about horizontal axes that are generally perpendicular to the paths of the trays. This roller support provides for free movement of the trays in a horizontal direction, within limits, to accommodate manufacturing and assembly tolerances. The rollers are standard parts, whose numbers may be increased to increase the load carrying capacity of the trays.

The chain, sprocket, and motor drive for the chain are mounted inside of the endless chains, which is an advantage over the above-mentioned known systems.

BRIEF DESCRIPTION OF THE DRAWINGS

Further objects, features, and advantages of the present invention will become more clear from the following detailed description of a preferred embodiment, as illustrated in the drawing, wherein:

FIG. 5 is a partial cross sectional view taken on a vertical plane through one side of one conveyor section of the apparatus, on an enlarged scale; and FIG. 6 is a partial cross sectional view taken along line 6—6 of FIG. 5.

THE PREFERRED EMBODIMENT

Figure 1:
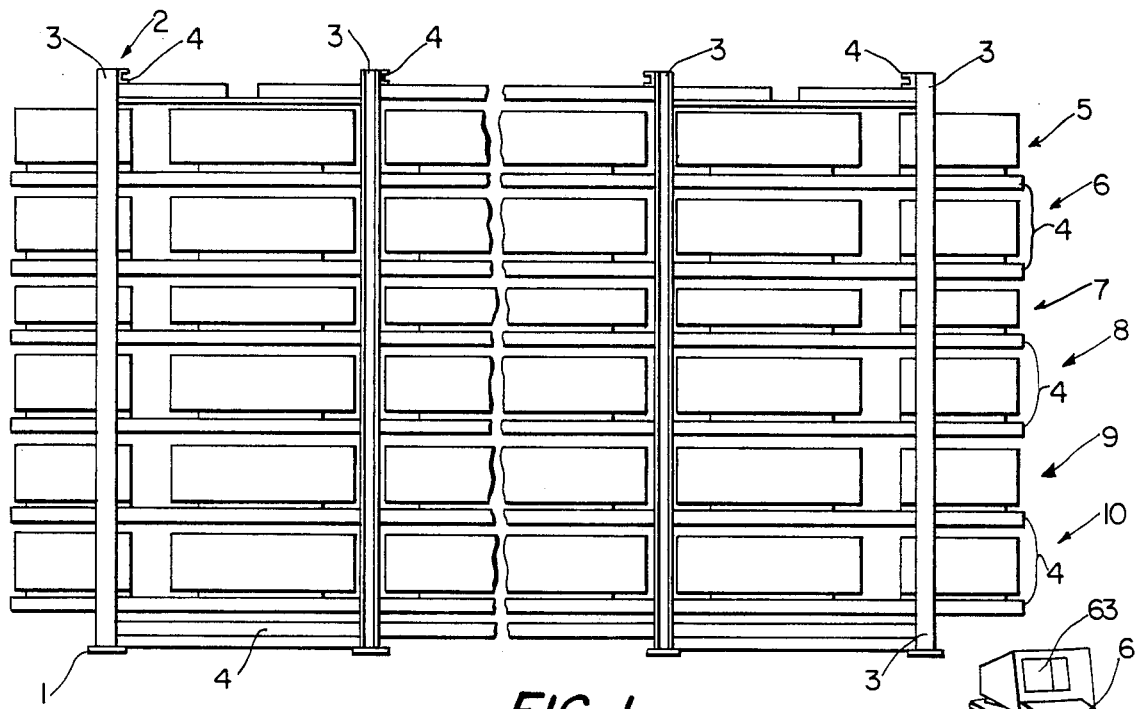
FIG. 1 is a side elevational view of the storage and retrieval apparatus according to the present invention.

A preferred embodiment of the present invention is shown in the figures, and is designed to rest upon a floor 1 or other support surface. A rigid frame 2 includes a plurality of upright, preferably vertical, columns 3 that are rigidly interconnected by means of beams 4. This frame 2 supports a plurality of conveyor sections, there being shown six in FIGS. 1 and 2, although more or less may be employed according to the teachings of the present invention. These conveyor sections 5, 6, 7, 8, 9 and 10, are vertically spaced from one another, vertically aligned with respect to each other, and substantially identical to each other. The sections may be of different height, for example, it is shown that conveyor section 7 is of a lesser height than the other conveyor sections.

Since each of the conveyor sections is substantially the same, only one conveyor section will be described in detail with respect to FIGS. 3-6, with it being understood that such details also apply to the other conveyor sections.

Figure 2:
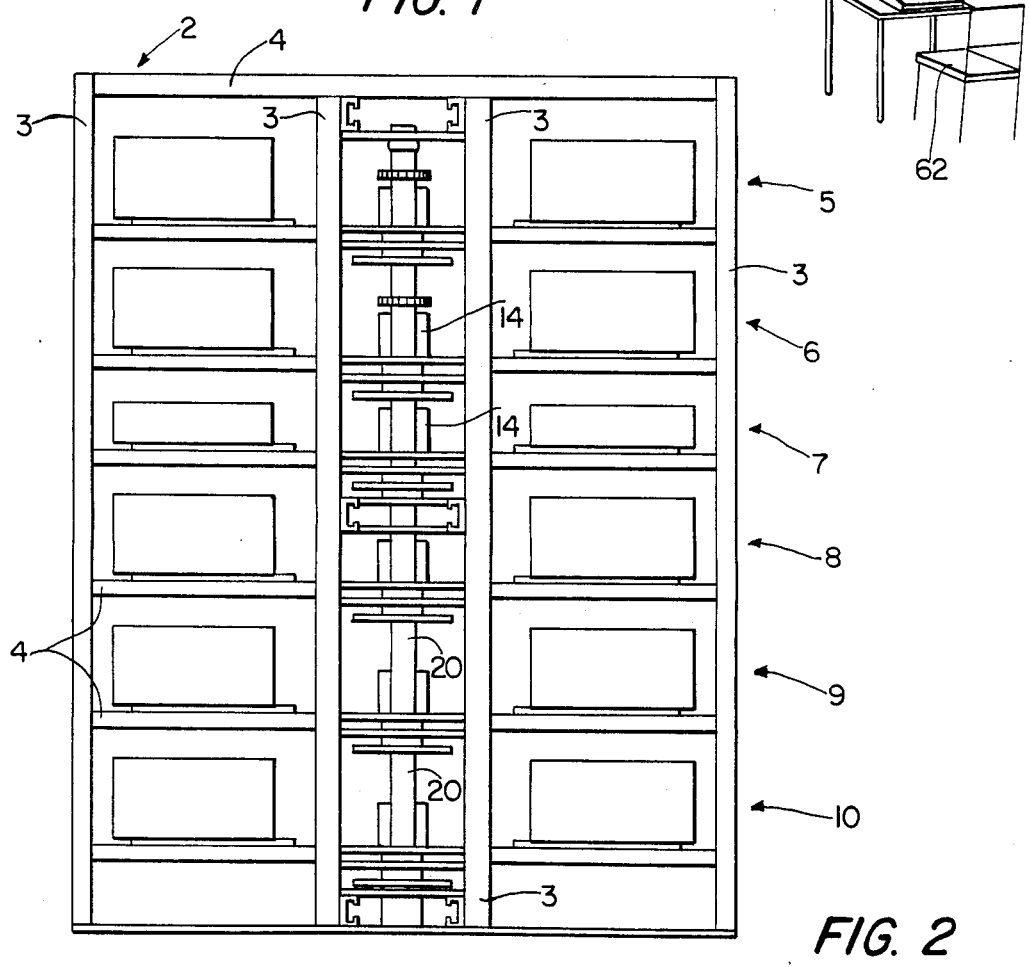
FIG. 2 is an end elevational view of the storage and retrieval apparatus of claim 1, on a larger scale.
Figure 3:
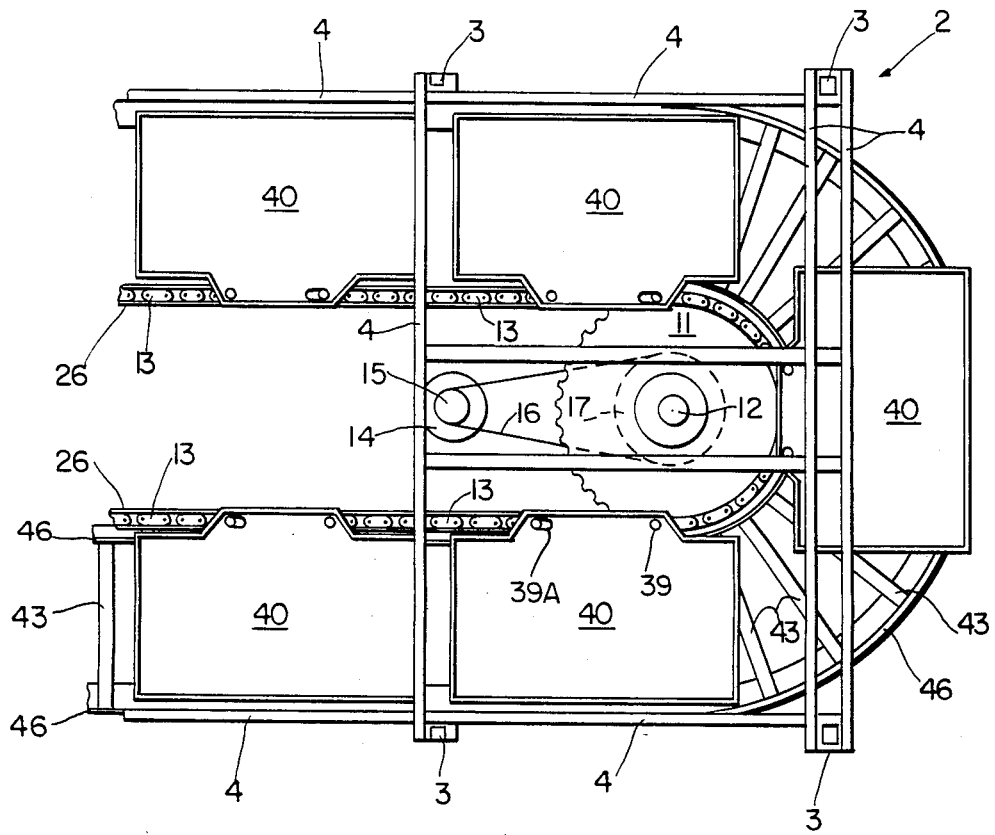
FIG. 3 is a top plan view of one end of the apparatus of FIG. 2.

The right-hand portion of the apparatus shown in FIG. 1. is viewed from above in FIG. 3, and it will be understood that the left-hand portion, as viewed from above, will be a mirror image, but without the to be described drive for the conveyor chain. More specifically, in FIG. 3, it may be seen that a large sprocket 11 is rotatably mounted on the frame for rotation about a vertical axis 12. There is a corresponding sprocket at the left-hand end of the apparatus as viewed in FIG. 1, although not shown in the drawing. A sprocket 11 is a driven sprocket, while the other sprocket may be an undriven sprocket, and with respect to the undriven sprocket, a toothless wheel is considered an equivalent, with respect to the desired function of supporting and changing the direction of the drive chain 13. Therefore, it is seen that the chain 13 is supported to rotate in a plane, preferably a horizontal plane, so as to have two parallel spaced-apart rectilinear runs and two semicircular connecting portions at the opposed sprockets. The chain is an endless or closed loop chain. With the employment of additional sprockets or chain guide wheels, other chain configurations can be obtained and are contemplated.

As seen in FIG. 3, a motor 14 is mounted on the frame to be actuated and drive the sprocket 11 through a transmission, comprising a motor sprocket 15, motor chain 16, and transmission sprocket 17, with the sprocket 17 being drivingly connected, preferably bolted, to the sprocket 11 and the motor sprocket 15 being keyed or otherwise drivingly connected to the motor 14. This transmission 15, 16, 17 may be replaced by a belt and pulleys, gear transmission, or equivalent mechanisms, and preferably with a gear ratio being involved. It is preferred that motor 14 be an electric motor, although it is contemplated that other power sources may be employed, for example, a fluid rotary motor.

As more clearly shown in FIG. 5, the sprocket 11 and the sprocket 17 are drivingly connected together, in a releasable fashion, and drivingly connected to a hub 18, by bolts 19, which is rotatably mounted within the vertical axis bearing 20. The motor 14, sprockets 15, 17, 11, the chain 16, and bearing 20 are all carried on a support plate 21 that is generally rectangular and has opposite sides carried on rails 22, one of which is shown in FIG. 5. In this manner, the support plate 21 and its above mentioned supported structure for driving the chain 13 may be moved on the rails 22 in a direction perpendicular to FIG. 5 (to the right and left in FIG. 3 and FIG. 1) to adjust the tension in the chain 13 to compensate for wear and for other purposes. Alternative adjustments are contemplated, for example, the other sprocket may be adjustably mounted on the frame. Preferably, the motor 14 is spaced from the sprocket 11 in the direction of the length of the apparatus, as shown in FIG. 3, so that the width of the apparatus (the vertical direction in FIG. 3) may be as small as possible. Alternatively, the motor may be mounted as shown in FIG. 5, although this is less desirable. A plurality of fasteners, particularly bolts 23, extend between the plate 21 and the rail 22 for releasably locking the drive structure in its adjusted position. Preferably, the separate drive for each conveyor section is separately adjustable from the separate drives for the other conveyor sections, although it is contemplated that all the drives may be rigidly connected together to be adjusted as a unit, and it is further contemplated that two or more conveyor sections may be commonly driven, although this is not preferred.

The drive chain 13 thereby is driven in an endless closed conveying path, which is preferably in a horizontal plane. The path of the chain and other structure hereinafter referred to as being in a horizontal plane may, of course, vary from true horizontal or even have a curved portion (as viewed in elevation and within the flexible limits of the chain) that is, be generally horizontal. To obtain true alignment and the preferred precise horizontal plane, each column 3 is provided with conventional height adjusting feet 24 having a threaded connection 25 with a nut (not shown) secured within the column 3, so that the feet 24 may be rotated to extend or retract them and thereby change the height of the column 3 and thereby the level of the frame.

To guide the chain laterally, that is, in a horizontal direction perpendicular to the conveying path, there is provided a chain guide 26, shown in FIG. 5. The chain guide 26 includes different portions respectively extending along substantially the entire rectilinear runs of the chain between the sprockets. Each chain guide portion more particularly includes two right angle, preferably metal, angle irons 27, 28, each of which has a vertical flange and a horizontal flange. The vertical flanges are spaced apart a fixed width, while the horizontal flanges engage each other and overlap. At least some of the chain pins are provided with wheels 29, which are freely rotatably mounted between upper chain links 30, 31 and lower chain links 32, 33. The diameter of the wheel 29 is substantially equal to, and preferably slightly smaller than, the spacing between the interior surfaces of the vertical flanges of the angle irons 27, 28. Once the spacing is established, the horizontal flanges of the angle irons 27, 28 are welded at 34. A bracket 35 is releasably secured, by means of a fastener, preferably a bolt, 36 to the column 3. The column 3, as shown in FIG. 6, is provided with a plurality of through apertures 37, for selectively receiving the fastener 36 to establish the height of the chain guide 26. Each chain guide 26 would thereby establish an upwardly extending open channel for receiving therein the chain, with rolling contact with the chain wheels, and have one end immediately adjacent one sprocket and its opposite end immediately adjacent another sprocket so as to establish the path of the chain and thereby the conveying path as will be seen below.

The chain 13 further has some of its pins extending upwardly at 38 a distance greater than its other pins, so as to extend through a hole 39 in a tray 40. The tray is preferably integrally formed in one piece of homogeneous material, for example, of cast aluminum or molded synthetic resin. A reinforcing boss 41 is formed around the hole 39 for receiving the pin 38, which boss rests upon the uppermost adjacent link of the chain at its bottom surface, and at its top surface has a conventional washer and retaining ring structure 42 to prevent vertical movement between the tray and chain, while establishing a driving connection between the tray and chain, which connection is fixed in the sense that the chain and tray move together around the conveying path without any relative motion between them, although the connection can be deliberately removed for replacing the tray or the chain. The chain is a standard item that may be purchased from stock from a chain manufacturer, complete with some of the pins being elongated and the wheels 29, so that its cost and availability is far superior to the special purpose chains used in some prior art devices.

The bottom surface of the tray 40 is supported on a plurality of rollers 43. The rollers 43 are arranged in an endless array around the entire conveying path. The rollers 43 are mounted on anti-friction bearings 44 for free rotation about horizontal axes, respectively, that extend generally perpendicular to the conveying path, that is, the rollers 43 are undriven. The rollers 43 extend to the outside of the chain 13 and have their upper support surfaces extending generally in a common plane (defined as above) for supporting the trays and the load carried thereon. The bearings 44 of the rollers 43 are mounted on a fixed shaft 45, which in turn is fixedly received within mounting brackets 46 at its opposite ends and secured by means of threaded fasteners 47. These rollers 43 are standard undriven conveyor rollers, which may be purchased from stock, and therefore they are inexpensive and easily replaced. As seen more particularly in FIGS. 5 and 6, the opposed mounting brackets 46 are spaced a fixed distance from each other, as determined by the width of the rollers, and rigidly secured at such spacing by a plurality of rigid straps 49 that are secured directly between the inner and outer rails, that is, the mounting brackets 46, at a plurality of locations spaced around the conveying path for rigidly fixing the spacing between the rails. The straps 49 are preferably welded to the mounting brackets or rails 46. The mounting brackets or rails 46 are provided with a plurality of through apertures 50, which are preferably noncircular for receiving a preferably noncircular portion of the shaft 45. It is noted from FIG. 6 that there are more of the apertures 50 than rollers 43, so that additional rollers 43 may be added to increase the load carrying capacity of the trays 40. Preferably, the rollers are approximately one inch or an inch and one-quarter in diameter, while the apertures are one and one-half inches in spacing along the entire length of the rails. The rails extend over the entire conveying path. A rail bracket, preferably a small right angle bracket 51, is secured by means of a threaded fastener, preferably a bolt, at 52 to a selected one of the apertures 37 in the column 3. The bracket 51 preferably fits within a downwardly opening U-shaped channel cross beam 53, which is secured at its opposite end in the same manner to another column 3. Thereby, there are a plurality of cross beams rigidly mounted at their opposite ends to the frame to extend across the conveying path at a plurality of locations spaced along the path. The rails 46 are mounted on, preferably merely rest upon, the cross beams 53 and are secured thereto by means of threaded fasteners 54.

It can be seen that the removable threaded connectors or fasteners, preferably bolts, releasably secure together the columns 3, the frame beams 4, cross beams 53, rails 46 and chain guide 26, so that the entire apparatus may be easily assembled on location. Also, the rails 46 may be made up in short sections, for example, three feet long, which may be handled easily. The chain guide 26 establishes the general conveying path, and provides for vertical post motion between the tray and the frame to compensate for various manufacturing and assembling tolerances, while establishing precisely the horizontal movement of the tray. In a similar manner, the above mentioned sections of rails, that are rigidly secured together through welding in a permanent manner by the straps 49 and have thereon the rollers, may be easily rested upon the cross beams 53 and secured thereto. It is seen, particularly in FIG. 6, that the rollers extend above their support rails 46, so that there is no criticality in aligning adjacent sections of such rails and rollers, and the trays are supported precisely in the vertical plane, while permitting considerable horizontal lost motion between the trays and rollers or frames. Therefore, it is seen that there is no criticality in the assembly relationship between the chain guide and rollers 43, which greatly simplifies installation and reduces cost of installation and maintenance. Since the various components are bolted together, they may be easily replaced when damaged or worn. These features are further enhanced by means of the adjustable spacing provided by the feet 24. The present invention is an improvement over a similar system wherein wheels are carried by each tray and which travel on inner and outer wheel rails. In such a prior art device, it is seen that the spacing between the wheel rails and chain guide is critical and must be determined upon installation. In contrast, the present invention determines the spacing between the rails 46 relatively easily at a factory where skilled labor and assembly jigs may be used, which spacing is fixed by means of welding. All of the assembly at the site is easily accomplished with threaded fasteners and involves no such critical spacing.

Figure 4:
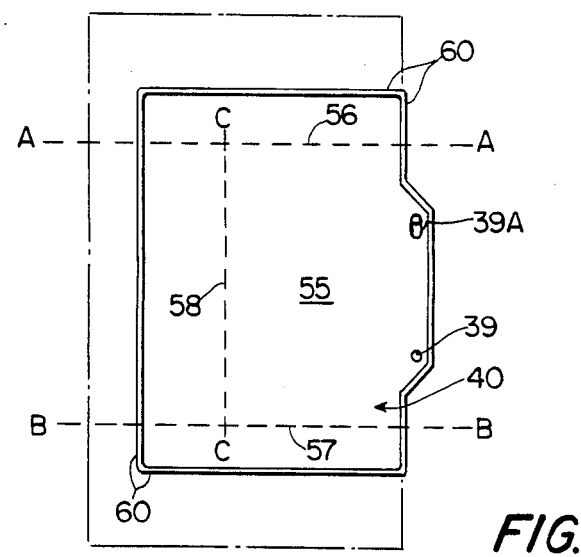
FIG. 4 is a top plan view of a tray usable in the apparatus.

The apparatus has considerable versatility, in that, as mentioned above, the load carrying capacity of the trays may be easily established or changed by means of adding or subtracting rollers 43. The number of trays and spacing between trays is easily established by mounting the trays upon different pins 38. The trays themselves may be of different sizes. As shown in FIG. 4, the tray is molded in one piece or cast in one piece, but in three mold portions. A first mold portion 55, bordered by lines AA, CC, BB, is common to all the sizes of the trays. For longer trays, as measured in the direction of the conveying path, mold portions 56 and 57 are replaced by longer mold portions, which mold portions are defined in FIG. 4 as respectively above line AA and below line BB. For a wider tray, as measured in the direction perpendicular to the conveying path, different mold portions 56 and 57 are needed, as well as a wider mold portion 58, as defined to the left of line CC and between lines AA and BB. This is a conventional molding technique in the manufacture of synthetic resin boxes, but has considerable utility in the construction of the trays of the present invention.

While articles may be supported directly by the trays themselves, for storage, picking and loading, preferably the trays support boxes 59. The boxes 59 are preferably open top boxes, although covers may be employed where desired. The boxes may be provided with plan view dimensions substantially the same as that of the trays 40, and to establish a driving connection between the boxes and the trays, the trays are provided with a peripheral upstanding flange 60 that will retain the box on the tray. The boxes may be made in different sizes corresponding to the different sized trays. Further, the boxes may be of different height, and the height of the conveying sections established by means of the placement of the threaded fasteners within the apertures 37. With respect to height, another advantage of the present invention with respect to the prior art is that the chain drive structure is completely within the endless loop of the chain and does not pass over the chain as to be outside of the conveying path, which would require additional vertical spacing, as well as room to the outside of the conveying path.

The assignee of the present invention has experience with the above mentioned prior art apparatus, and an experimental prototype of the present invention was found to involve twentyfive to thirty percent less installation time, less skilled installers, and a cost of fifty percent less than the previous system. The obtaining of replacement parts is quicker, since the columns, rails, guides and the like are stock bent sheet metal items, and the chains and rollers are also stock items, that is, they do not require advance ordering or special manufacture. Preferably, the boxes 59 are of the well known nesting variety that require very little room to store as stock for the manufacturer, and are easily obtainable from many sources. The trays, most preferably, have their upstanding flanges 60 flared upwardly and outwardly, now shown in the drawing, so that they too may be nested and stacked to conserve storage space and facilitate storage and shipping. The rollers may be steel to increase their load carrying capacity, or they may be plastic or plastic coated to decrease their cost and decrease noise in conveying. To further reduce costs, the chain guide may be a conventional bent sheet metal channel.

The operation of the apparatus is according to a known system, wherein data concerning an article to be loaded or picked is entered at a keyboard 61 by an operator at an operation location, preferably a chair 62, for entry into the internal memory of a microcomputer associated with the keyboard 61 and a display screen 63. A switch, which may be at any location, for example, 64 in FIG. 5, is used as a sensor to determine tray movement, and the microcomputer stores in its permanent memory tray positioning and changes such tray positioning in accordance with movement of the trays. Other types of sensors may be employed, such as photocells, or the trays themselves may be coded so that a reader may directly read and identify individual trays at a particular location. This entire control structure thereby receives input data correlated to a particular article associated with a particular tray in a particular one of the conveyor sections. The control can thereby automatically move the particular tray to one of a picking or loading station by actuating the associated power apparatus, including motor 14, for driving the chain and the connected trays to the desired location and thereafter deactivating the power drive for the chain and trays. The picking and loading station, as is conventional, may, in fact, be the same station, spaced stations, or many different spaced stations. For example, the picking station may be at the far left in FIG. 1, whereas the loading station may be at the far right in FIG. 1, but they have fixed definite locations with respect to the microcomputer control. Since the rollers or wheels are not mounted on the trays themselves, this reduces the moving mass, which is further reduced by the fact that the trays may be of very light construction, since they are supported along a plurality of support lines established by the plurality of rollers that engage their bottom. Thereby the construction of the trays is considerably simplified and their weight is reduced. Since the chain is a standard item, its mass is also reduced with respect to the above mentioned conventional apparatus. This weight reduction greatly increases the response time for automatically moving the trays to different positions.

While a preferred embodiment has been set forth, variations, other embodiments and modifications have also been set forth as examples of how the preferred embOdiment may be modified. Therefore, the specific details are important in their own right, but also important in representing broader principles and structure, or as determined by the spirit and scope of the following claims.

It is further recognized that the chain 13 has some of its pins extending upwardly at 38, a distance greater than its other pins, so as to extend through and be fastened to tray 40. When chain 13 is stretched into a straight line, the pins are on a fixed center (Value X). As the chain is wrapped around the sprocket while negotiating the 180° end turn, the fixed centers of the upwardly extending pins 38 decreases (Value X, −Y). This value is the ratio between the arc and the chord of the pitch radius of the sprocket. To compensate for the change in center distance, it is necessary to elongate preferably one (1) hole 39 into a slot $39_A$ as shown in FIG. 3 and FIG. 4.

It is an accepted fact that the surface speed of the roller 43 matches the surface speed of the tray 40 providing the conveyance surface is straight. A further accepted fact is that the surface speed of the rollers 43 and the tray 40 are mismatched as they negotiate the 180° turn at the end of the unit. This provides a scuffing or slippage between the roller 43 and the tray 40. In many cases, this is an acceptable condition.

It is, however, possible to match the surface speed conditions between the roller 43 and the tray 40 by using tapered rollers in the 180° turn area only (standard rollers would be used in the straight sections). The taper of the rollers must be calculated to correspond with the surface speed of the tray 40.

Since the tray is preferably integrally formed in one (1) piece of a homogenous material, it is recognized that the material could be a molded synthetic resin which is non-conductive. In this situation, the material conveyed on said tray will accumulate static electricity and transfer electro-static discharge when contact is made with a grounded source. This condition can be eliminated by the utilization of a conductive tray 40. A tray can even be produced from a synthetic resin providing that the resin has conductive properties which can be achieved by the introduction of filler materials such as carbon.

We claim:

1. In a storage and retrieval system, comprising a rigid frame to be supported on a floor, said frame having a plurality of rigid upright columns and a plurality of beams rigidly interconnecting said columns, and
   a plurality of endless horizontally traveling conveyor sections mounted on said frame, spaced vertically from one another, in vertically aligned relationship and being substantially identical to each other,
   the improvement comprising each of said sections including:
   at least one drive sprocket and at least another sprocket mounted in substantially the same plane for rotation about respective vertical axes, which are spaced from one another;
   power means for selectively rotating said drive sprocket;
   an endless drive chain drivingly engaging said sprockets and extending in a substantially horizontal plane along a closed conveying path;
   means to guide said chain along said path between said sprockets;
   an endless array of a plurality of undriven rollers mounted for rotation about horizontal axes generally perpendicular to said path, and said array extending around the entire path to the outside of said chain;
   a plurality of generally horizontally extending trays drivingly connected to said chain at a corresponding plurality of positions spaced along said chain to extend outwardly from said chain and travel with said chain in said path, and said trays engaging and being supported on said rollers; and
   a picking station to the outside of said path, a loading station to the outside of said path and spaced along said path from said picking station, so that the articles may be placed on said tray at said loading station, stored in its conveyor section, conveyed to said picking station, and removed from said trays at said picking station.

2. The system of claim 1 wherein each of said conveyor sections includes an outer rail and an inner rail, said rails each extending in a closed loop at a fixed horizontal spacing from each other in a common substantially horizontal plane, each rail having an equal plurality of horizontal through apertures aligned in a direction perpendicular to said path with a corresponding aperture in the other rail, and said undriven rollers being mounted at their opposite ends in respective ones of some of said aligned apertures, so that additional rollers may be mounted in other aligned apertures to increase the load carrying capacity of said trays; and
   said rollers lying generally in a common generally horizontal plane with their top surfaces in a support plane that is spaced above said rails.

3. The system of claim 2 wherein a plurality of rigid straps are rigidly secured directly between said inner and outer rails at a plurality of locations spaced around said path for rigidly fixing the spacing between said rails.

4. The system of claim 3 wherein a plurality of cross beams are rigidly mounted at their opposite ends to said frame and extend across said path at a plurality of locations spaced apart along said path, said rails being mounted on and secured to said cross beams.

5. The system of claim 4 wherein removable threaded connector means secure together the columns and beams of said frame, the cross beams to said frame, the rails to said cross beams, and the means to guide said chain to one of said cross beams and frame.

6. The system of claim 2 wherein a plurality of cross beams are rigidly mounted at their opposite ends to said frame and extend across said path at a plurality of locations spaced apart along said path, said rails being mounted on and secured to said cross beams.

7. The system of claim 6 wherein removable threaded connector means secure together the columns and beams of said frame, the cross beams to said frame, the rails to said cross beams, and the means to guide said chain to one of said cross beams and frame.

8. The system of claim 1 wherein said means to guide said chain include two angle irons together having upstanding spaced apart vertical flanges and overlapping engaging horizontal flanges, and means securing said horizontal flanges rigidly to each other and said frame.

9. The system of claim 8 wherein said chain includes a plurality of upper and lower links pivotally secured to each other by link pins that extend vertically, a plurality of wheels mounted on at least some of said link pins for free rotation about respective vertical axes, said wheels extending between and engaging said vertical flanges with a diameter substantially equal to the spacing between said vertical flanges, and some of said pins extending upwardly beyond said links and including means connecting them directly to said trays.

10. The system of claim 9 wherein each of said trays consists of a single piece of homogeneous material having a generally planar bottom, a peripheral small upstanding flange, and at least two apertures for mounting on said chain; and said bottom directly engages said rollers for supporting the entire weight of said trays on said rollers, each of said conveyor sections further including a plurality of generally rectangular boxes resting on respective ones of said trays.

11. The system of claim 10 wherein said power means and sprockets all are mounted on said frame inside of said path for horizontal adjustment relative to said frame for adjusting the tension in said chain.

12. The system of claim 1 wherein said power means and sprockets all are mounted on said frame inside of said path for horizontal adjustment relative to said frame for adjusting the tension in said chain.

13. The system of claim 12, wherein:
said means to guide said chain includes two angle irons together having upstanding spaced apart vertical flanges and overlapping engaging horizontal flanges, and means securing said horizontal flanges rigidly to each other and said frame; and
said chain includes a plurality of upper and lower links pivotally secured to each other by link pins that extend vertically, a plurality of wheels mounted on at least some of said link pins for free rotation about respective vertical axes, said wheels extending between and engaging said vertical flanges with a diameter substantially equal to the spacing between said vertical flanges, and some of said pins extending upwardly beyond said links and including means connecting them directly to said trays.

14. The system of claim 1 wherein automatic control means receive an input correlated to a particular article associated with a particular tray in a particular one of said conveyor sections, automatically move said particular tray to one of said picking and loading stations by actuating the associated power means to drive said chain and the connected trays, and deactuate said power means when said particular tray reaches said one station.

15. The system of claim 14 wherein said control means includes an entry keyboard for entering data, a display screen for displaying data, storage means for storing data, and sensor means for determining the location of the one tray relative to said picking station and said loading station.

16. The system of claim 15 wherein each of said conveyor sections includes an outer rail and an inner rail, said rails each extending in a closed loop at a fixed horizontal spacing from each other in a common substantially horizontal plane, each rail having an equal plurality of horizontal through apertures aligned in a direction perpendicular to said path with a corresponding aperture in the other rail, and said undriven rollers being mounted at their opposite ends in respective ones of some of said aligned apertures so that additional rollers may be mounted in other aligned apertures to increase the load carrying capacity of said trays; and said rollers lying generally in a common generally horizontal plane with their top surfaces in a support plane that is spaced above said rails.

17. The system of claim 16 wherein a plurality of rigid straps are rigidly secured directly between said inner and outer rails at a plurality of locations spaced around said path for rigidly fixing the spacing between said rails;
a plurality of cross beams are rigidly mounted at their opposite ends to said frame and extend across said path at a plurality of locations spaced apart along said path, said rails being mounted on and secured to said cross beams; and
removable threaded connector means secure together the columns and beams of said frame, the cross beams to said frame, the rails to said cross beams, and the means to guide said chain to one of said cross beams and frame.

18. The system of claim 17 wherein each of said trays consists of a single piece of homogeneous material having a generally planar bottom, a peripheral small upstanding flange, and at least two apertures for mounting on said chain; and said bottom directly engages said rollers for supporting the entire weight of said trays on said rollers, each of said conveyor sections further including a plurality of generally rectangular boxes resting on respective ones of said trays.

19. The system of claim 18 wherein said means to guide said chain includes two angle irons together having upstanding spaced apart vertical flanges and overlapping engaging horizontal flanges, and means securing said horizontal flanges rigidly to each other and said frame;
said chain includes at a plurality of upper and lower links pivotally secured to each other by link pins that extend vertically, a plurality of wheels mounted on at least some of said link pins for free rotation about respective vertical axes, said wheels extending between and engaging said vertical flanges with a diameter substantially equal to the spacing between said vertical flanges, and some of said pins extending upwardly beyond said links and including means connecting them directly to said trays; and
said power means and sprockets all are mounted on said frame inside of said path for horizontal adjustment relative to said frame for adjusting the tension in said chain.

20. The system of claim 16 wherein said power means and sprockets all are mounted on said frame inside of said path for horizontal adjustment relative to said frame for adjusting the tension in said chain.

21. The system of claim 16 wherein said means to guide said chain include two angle irons together having upstanding spaced apart vertical flanges and overlapping engaging horizontal flanges, and means securing said horizontal flanges rigidly to each bther and said frame;

said chain includes at a plurality of upper and lower links pivotally secured to each other by link pins that extend vertically, a plurality of wheels mounted on at least some of said link pins for free rotation about respective vertical axes, said wheels extending between and engaging said vertical flanges with a diameter substantially equal to the spacing between said vertical flanges, and some of said pins extending upwardly beyond said links and including means connecting them directly to said trays;

each of said trays consists of a single piece of homogeneous material having a generally planar bottom, a peripheral small upstanding flange, and at least two apertures for mounting on said chain; and said bottom directly engaging said rollers for supporting the entire weight of said trays on said rollers; and each of said conveyor sections further includes a plurality of generally rectangular boxes resting on respective ones of said trays.

22. The system of claim 16 wherein each of said trays consists of a single piece of homogeneous material having a generally planar bottom, a peripheral small upstanding flange, and at least two apertures for mounting on said chain; and said bottom directly engages said rollers for supporting the entire weight of said trays on said rollers; and each of said conveyor sections further includes a plurality of generally rectangular boxes resting on respective ones of said trays.

23. The system of claim 22 wherein said power means and sprockets all are mounted on said frame inside of said path for horizontal adjustment relative to said frame for adjusting the tension in said chain.

24. A storage and retrieval system, comprising:

a frame having a plurality of columns and a plurality of beams interconnecting said columns;

a plurality of endless travelling conveyor sections mounted on said frame and spaced vertically apart from one another, in vertically aligned relationship, each of said conveyor sections including:

at least one drive sprocket and a second sprocket mounted in substantially the same plane for rotation about respective vertical axes, said drive sprocket and said second sprocket being spaced apart from one another;

power means for selectively rotating said drive sprocket;

a plurality of generally horizontally extending trays;

drive chain means encircling both said sprockets in a closed conveying path and being connected to said plurality of trays at a corresponding plurality of spaced apart positions around said path, for transferring power from said drive sprocket to said second sprocket and for conveying said plurality of trays around said path, said plurality of trays being connected along said drive chain means to extend outwardly from said drive chain means and travel with said drive chain means along said path;

means for guiding said drive chain means along said path between said sprockets;

a plurality of load bearing sections resting upon said beams, positionable around said conveying path at an indiscriminate distance from said guiding means to form an endless array of a plurality of undriven rollers mounted for rotation about horizontal axes generally extending outwardly from said closed conveying path, said array extending around the entire conveying path to the outside of said chain, whereby said trays are supportable on said undriven rollers along the entire length of said conveying path.

25. The system of claim 24, wherein each of said conveyor sections comprises:

an outer rail and an inner rail, said rails extending in a closed loop at a fixed horizontal spacing from each other in a common substantially horizontal plane, each rail having an equal plurality of horizontal through apertures aligned in a direction extending outwardly from said path and through a corresponding aperture in the other of said rails, said undriven rollers being mounted at their opposite ends in corresponding ones of said aligned apertures;

said rollers lying generally in a common generally horizontal plane with their top surfaces in a support plane spaced above said rails; and a plurality of rigid straps rigidly secured directly between said inner and outer rails at a plurality of locations spaced around said path for rigidly fixing the spacing between said rails.

26. The system of claim 24, wherein said power means and said sprockets are all mounted on said frame inside of said conveying path for horizontal movement relative to said frame for adjusting the tension in said chain.

27. The system of claim 24, wherein each of said trays includes: one element connectable to a corresponding part of said chain to prevent relative horizontal movement between said tray and said corresponding part; and a second element connected to said chain to accommodate relative movement between said tray and said chain.

28. The system of claim 27, wherein said trays have upstanding flanges flared upwardly and outwardly.

29. The system of claim 24, wherein said plurality of trays extend outwardly from said drive chain by a first distance and said undriven rollers provide load-bearing surfaces extending over second distances along said horizontal axes, said second distances being substantially greater than one-half of the length of said first distance.

30. The system of claim 29, wherein said load-bearing sections are positionable relative to said drive chain means to render said second distances co-extensive with said first distance over substantially more than one-half of the length of said first distance.

31. The system of claim 24, wherein said power means selectively rotates said drive sprocket independently of any other sprocket in other of said conveyor sections.

32. The system of claim 1, wherein said trays extend outwardly by a first distance from said chain and said rollers provide load-bearing surfaces extending over second distances along said horizontal axes, said second distances being substantially greater than one-half of the length of said first distance.

33. The system of claim 32, wherein said rollers are positionable relative to said drive chain to render said second distances co-extensive with said first distance over substantially more than one-half of the length of said first distance.

34. The system of claim 1, wherein said array of rollers is positionable at indiscriminate distances from said outside of said chain.

35. A storage and retrieval system, comprising:
a frame having a plurality of columns and a plurality of beams interconnecting said columns;
a plurality of endless travelling conveyor sections mounted on said frame and spaced vertically apart from one another, in vertically aligned relationship, each of said conveyor sections including:
at least one drive sprocket and a second sprocket mounted in substantially the same plane for rotation about respective vertical axes, said drive sprocket and said second sprocket being spaced apart from one another;
power means for selectively rotating said drive sprocket independently of any other sprocket in another of said conveyor sections;
a plurality of generally horizontally extending trays;
drive chain means encircling both of said sprockets in a closed conveying path and being connected to said plurality of trays at a corresponding plurality of spaced apart positions around said path, for transferring power from said drive sprocket to said second sprocket and for conveying said plurality of trays around said path, said plurality of trays being connected along said drive chain means to extend outwardly by a first distance from said drive chain means and travel with said drive chain means along said path;
means for guiding said drive chain means along said path between said sprockets;
a plurality of load bearing sections resting upon said beams, positionable around said conveying path at an indiscriminate distance from said guiding means to form an endless array of a plurality of undriven rollers mounted for rotation about horizontal axes generally extending outwardly from said closed conveying path, said array extending around the entire conveying path to the outside of said chain, said plurality of undriven rollers providing load-bearing surfaces extending over second distances along said horizontal axes, said second distances being substantially more than one-half of the length of said first distance, wherein said trays are supportable on said undriven rollers along the entire length of said path.

36. The system of claim 35 wherein each of said load bearing sections includes an outer rail and an inner rail, said rails each extending in a closed loop at a fixed horizontal spacing from each other in a common substantially horizontal plane, each rail having an equal plurality of horizontal through apertures aligned in a direction perpendicular to said path with a corresponding aperture in the other rail, and said undriven rollers being mounted at their opposite ends in respective ones of some of said aligned apertures, so that additional rollers may be mounted in other aligned apertures to increase the load carrying capacity of said trays; and
said rollers lying in a common generally horizontal plane with their top surfaces in a support plane that is spaced above said rails.

37. The system of claim 36 wherein a plurality of rigid straps are rigidly secured directly between said inner and outer rails at a plurality of locations spaced around said path for rigidly fixing the spacing between said rails.

38. The system of claim 35, wherein each of said trays includes: one element connectable to a corresponding part of said chain to prevent relative horizontal movement between said tray and said corresponding part; and a second element connected to said chain to accommodate relative movement between said tray and said chain.

39. The system of claim 35, wherein said load-bearing sections are positionable relative to said chain means to render said second distance co-extensive with said first distance over substantially more than one-half of the length of said first distance.

40. In a storage and retrieval system, comprising:
a frame having a plurality of columns and a plurality of beams interconnecting said columns; and
a plurality of endless travelling conveyor sections mounted on said frame, spaced vertically apart from one another, in vertically aligned relationship, each of said conveyor sections including:
at least one drive sprocket and a second sprocket mounted in substantially the same plane for rotation about respective spaced-apart vertical axes;
power means for selectively rotating said drive sprocket;
an endless drive chain drivingly engaging said sprockets and extending in a substantially horizontal plane along a closed conveying path;
means to guide said chain along said path between said sprockets;
an endless array of a plurality of undriven rollers mounted for rotation about axes generally perpendicular to said path, and said array extending around the entire path to the outside of said chain; and
a plurality of generally planar extending cargo-carrying members drivingly connected to said chain at a corresponding plurality of positions spaced along said chain to extend outwardly from said chain and travel with said chain in said path, said cargo carrying members engaging and being supported on said rollers along the entire length of said conveying path.

41. The system of claim 40 wherein each of said conveyor sections includes an outer rail and an inner rail, said rails each extending in a closed loop at a fixed planar spacing from each other in a common substantially horizontal plane, each rail having an equal plurality of horizontal through apertures aligned in a direction perpendicular to said path with a corresponding aperture in the other rail, and said undriven rollers being mounted at their opposite ends in respective ones of some of said aligned apertures, so that additional rollers may be mounted in other aligned apertures to increase the load carrying capacity of said cargo carrying members; and
said rollers lying in a common generally horizontal plane with their top surfaces in a support plane that is spaced above said rails.

42. The system of claim 41 wherein a plurality of rigid strap are rigidly secured directly between said inner and outer rails at a plurality of locations spaced around said path for rigidly fixing the spacing between said rails.

43. The system of claim 40, wherein each of said cargo carrying members includes: one element connectable to a corresponding part of said drive chain to prevent relative horizontal movement between said cargo carrying member and said corresponding part; and a second element connected to said drive chain to accommodate relative movement between said cargo carrying member and said drive chain.

44. The system of claim 40, wherein said plurality of cargo carrying members extend outwardly from said drive chain by a first distance and said undriven rollers provide load-bearing surfaces extending over second distances along said axes, said second distances being substantially greater than one-half of the length of said first distance.

45. The system of claim 44, wherein said conveyor sections are positionable relative to said drive chain means to render said second distances co-extensive with said first distance over substantially more than one-half of the length of said first distance.

46. The system of claim 40, wherein said power means selectively rotates said drive sprocket independently of any other sprocket in other of said conveyor sections.

* * * * *